(12) United States Patent
Sato et al.

(10) Patent No.: US 7,986,424 B2
(45) Date of Patent: Jul. 26, 2011

(54) LOCATION-BASED INFORMATION

(75) Inventors: Yuji Sato, Nagoya (JP); Masatoshi Kokubo, Ama-gun (JP); Kazuma Aoki, Kasugai (JP); Yukihiko Sato, Nagoya (JP); Satoru Yanagi, Nagoya (JP); Masanori Oda, Iwakura (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1449 days.

(21) Appl. No.: 11/368,675

(22) Filed: Mar. 7, 2006

(65) Prior Publication Data

US 2006/0202952 A1 Sep. 14, 2006

(30) Foreign Application Priority Data

Mar. 11, 2005 (JP) ................................. 2005-069441
Apr. 25, 2005 (JP) ................................. 2005-126559

(51) Int. Cl.
*G06F 15/00* (2006.01)
*G06F 15/173* (2006.01)

(52) U.S. Cl. ...................................... 358/1.15; 709/240

(58) Field of Classification Search ................ 358/1.15, 358/504, 501, 1.13, 1.14, 1.16, 1.18, 1.9, 358/3.06; 399/228, 440, 124, 207; 400/693, 400/58, 23, 103, 120.17, 322, 621; 709/229, 240, 220, 206

See application file for complete search history.

(56) References Cited

U.S. PATENT DOCUMENTS

2004/0048621 A1 * 3/2004 Takahashi et al. ......... 455/456.3
2004/0230904 A1    11/2004 Tada

FOREIGN PATENT DOCUMENTS

| CN | 1532802 A | 9/2004 |
|---|---|---|
| JP | 6-004038 | 1/1994 |
| JP | 2004240301 | 8/2004 |

OTHER PUBLICATIONS

English translation of Notification of the First Office Action dated Jan. 22, 2010 in Chinese application No. CN200610058181.9.

* cited by examiner

*Primary Examiner* — Saeid Ebrahimi Dehkordy
(74) *Attorney, Agent, or Firm* — Banner & Witcoff, Ltd.

(57) ABSTRACT

In response to a positional relationship (distance, or a combination of distance and angle) between an information output unit and a user who uses information displayed in the display unit, a control unit changes the amount of information to be displayed in the display unit based on an information level, the number of pieces of information, a scrolling speed or a cycle. In some aspects, the control unit controls the information output unit to increase the amount of information to be output when the user is close to the display unit.

28 Claims, 11 Drawing Sheets

LOCATION-BASED INFORMATION

CROSS REFERENCE TO RELATED APPLICATION

This application claims priority from Japanese Patent Application No. 2005-126559, filed on Apr. 25, 2005, and No. 2005-69441, filed on Mar. 11, 2005, the entire subject matter of these applications is incorporated herein by reference.

BACKGROUND

A great deal of information is currently transmitted everywhere, and people come in contact with information, which is provided via information output apparatuses in effectively all locations.

In such information output apparatuses that provide a great deal of information for people, an important thing is how effectively information can be provided for users who receive the information. Thus, proposals relating to the information output apparatuses have been made.

For example, Japanese Laid-Open Patent Publication No. 2004-240301 proposes an information output apparatus realizing a text display method that can both display information, to which a user should pay attention, with appropriate-sized characters that are large enough to read, and increase the amount of displayable information in the display unit as a whole. This information output apparatus is designed to divide text to be displayed in the display unit into lines and edit each line using a different fixed number of characters, so as to display a specified line with large-sized characters and other lines with small-sized characters.

However, in the above conventional information output apparatus, the providing of information is not considered in view of a positional relationship between the user and the output device of the information output apparatus. In other words, the providing of information is made based on the information output apparatus, and information cannot be always provided for the user with efficiency.

This is because the user's ability to see the display of the output device and/or hear any associated audio may be constrained by the user's eyesight and/or hearing. In other situations, the user's viewing angle may prevent the viewing of the information displayed by the output device. These issues of distance and viewing angle in some cases may be combined to further complicate understanding of the output information. In other words, when the output device is away from the user or the user is in a location where it is difficult for the user to recognize information outputted from the output device, at least some of the information provided in detail cannot be recognized by the user, and thus it often results in no meaning.

Taking the above conventional information output apparatus as an example, it is difficult for a user to read small-sized characters, which are displayed with large-sized characters. Display of the small-sized characters together with the large-sized ones leads to a limited display area of the large-sized characters. In addition, if a great number of characters are displayed at a time, it will give the user the impression of a complicated layout, which may lose the user's attention to reading, even if the display includes useful information.

SUMMARY

Aspects of the invention relate to an information output apparatus capable of outputting various kinds or amounts of information based on a user's location.

In other aspects, the invention provides an information output apparatus capable of providing a user with information the user needs in an appropriate form based on a course of action the user takes, namely, based on a positional relationship between the user and an output device of the information output apparatus.

BRIEF DESCRIPTION OF THE DRAWINGS

An illustrative embodiment of the disclosure will be described in detail with reference to the following figures wherein.

DETAILED DESCRIPTION OF EMBODIMENTS

Figure 1:
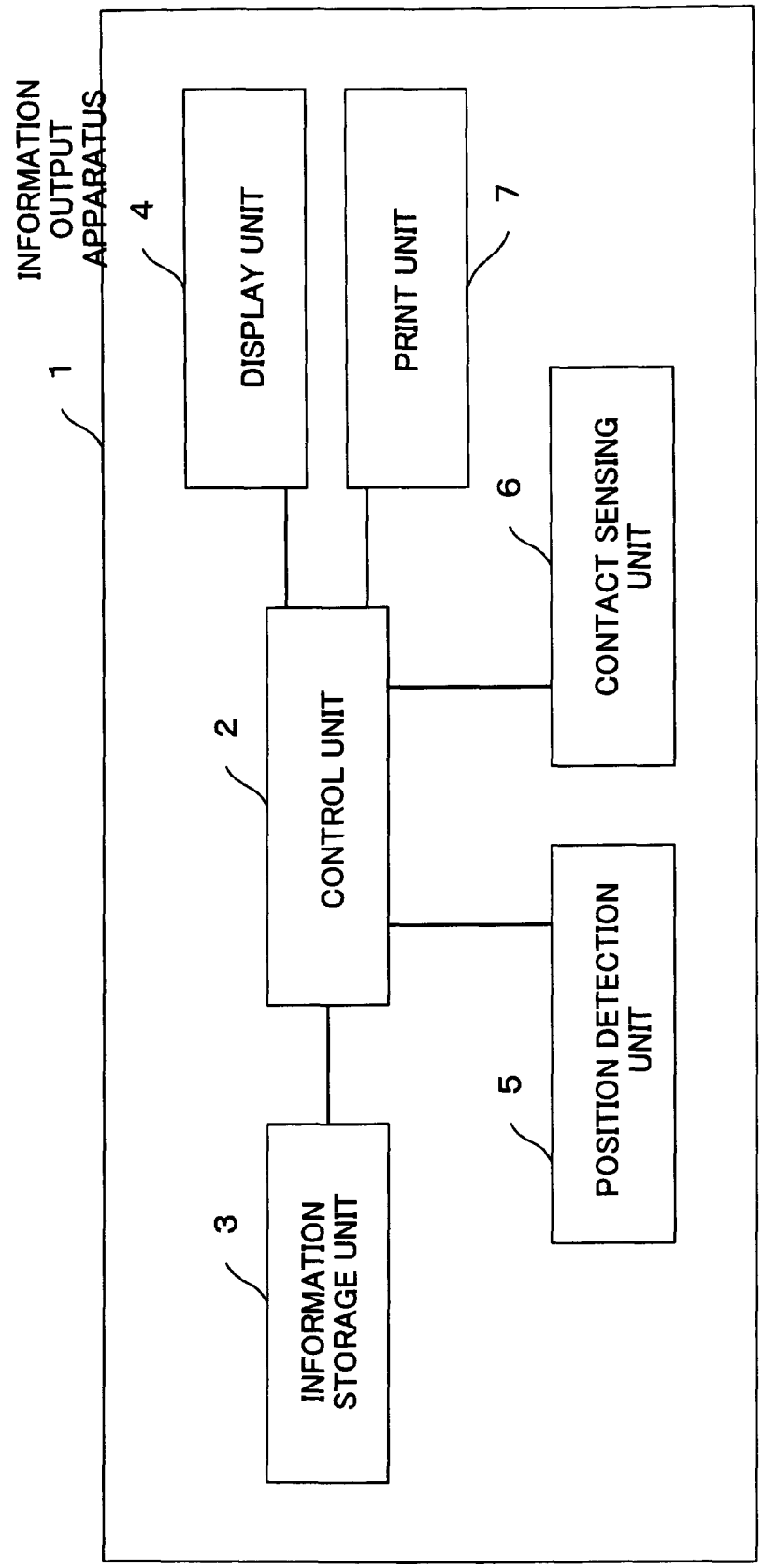
FIG. 1 shows a structure of an information output apparatus in accordance with aspects of the invention.

It is noted that various connections are set forth between elements in the following description. It is noted that these connections in general and, unless specified otherwise, may be direct or indirect and that this specification is not intended to be limiting in this respect.

General Overview of Various Aspects of the Invention

In the information output apparatus, a control device adjusts information granularity, the number of pieces of information, the scrolling speed, and the output cycle, in response to a positional relationship between an output device and the user who uses information outputted by the output device, and varies the amount of information to be outputted.

Thus, according to aspects of the invention, it is possible to provide available information to the user who is away from the output device so as to recognize the information with reliability, and provide more detailed information to the user who comes near to seek the detailed information.

According to an aspect of the invention, an information control system may include an information control system that outputs information capable of being output to an output device, the information control system including a determination device configured to determine a presence or absence of a user who uses information outputted by the output device and then determine an area where the user is present when said determination device determines the presence of the user; and a control device configured to control the output device to increase an amount of information outputted by the output device in incremental steps as the area where the user is close to the output device.

The information may be visual information, audible information, or a combination of both.

Thus, according to the information control system, information can be outputted in consideration with a distance between the output device and the user who uses the information outputted by the output device. The information control system can output the contents of the information in such a manner that the user, who is at a distance from the output device, can recognize it. The information control system may modify the information to be output based on an angle between a straight line from the output device to a user and a straight line perpendicular to the plane of the output device. The angle may be in at least one of a horizontal and a vertical direction.

According to one or more aspects of the invention, the output device may include a printer.

According to an aspect of the invention, an information control system that outputs information for an output device configured to output information may include a measurement device configured to measure a distance between the output device and a user who uses information outputted by the output device; and a control device configured to control the output device to increase an amount of information outputted by the output device when the distance measured by the measurement device is less than a predetermined distance as compared with the amount of information outputted by the output device when the distance measured by the measurement device is equal to or greater than the predetermined distance.

Thus, according to the information control system, information can be outputted in consideration with a distance between the output device and the user who uses the information outputted by the output device. The information control system can provide the contents of the information in such a manner that the user, who is at a distance from the output device, can recognize it.

According to an aspect of the invention, a specified position on the output device may be regarded as an origin of the output device, a first straight line may pass through the origin and a user position on a horizontal plane containing the origin, a second straight line may extend from the origin and be perpendicular to the output device on the horizontal plane containing the origin, and the control device may preferentially control the output device to decrease the amount of information outputted by the output device when an angle between the first straight line and the second straight line is equal to or greater than a predetermined angle as compared with the amount of information outputted by the output device when the angle is less than the predetermined angle.

Thus, according to the information control system, even if the user is close to the output device but it is difficult for the user to recognize the contents of the information because of a limitation in a viewable range of the output device in a horizontal direction, the information can be outputted in consideration with a positional relationship between the user and the output device. As a result, the information output apparatus can provide information to the user who is in the position that is difficult to recognize the information in such a manner that the user can recognize it, allow the user to recognize information that can be provided more reliably, and provide the user with the detailed contents of information if the user is interest in the information, by prompting the user to move to a position where the user can easily recognize the detailed contents of the information.

According to an aspect of the invention, a specified position on the output device may be regarded as an origin of the output device, a first straight line may pass through the origin and a user position where the user is present on a vertical plane containing a second straight line that extends from the origin and is perpendicular to the output device on a horizontal plane containing the origin, a third straight line may extend from the origin and be perpendicular to the output device on the vertical plane, and the control device may preferentially control the output device to decrease the amount of information outputted by the output device when an angle between the first straight line and the third straight line is equal to or greater than a predetermined angle as compared with the amount of information outputted by the output device when the angle is less than the predetermined angle.

Thus, according to the information output apparatus, even if the user is close to the output device but it is difficult for the user to recognize the contents of the information because of a limitation in a viewable range of the output device in a horizontal direction, the information can be outputted in consideration with a positional relationship between the user and the output device. As a result, the information control system can provide information to the user who is in the position that is difficult to recognize the information in such a manner that the user can recognize it, allow the user to recognize information that can be provided more reliably, and provide the user with the detailed contents of information if the user is interest in the information, by prompting the user to move to a position where the user can easily recognize the detailed contents of the information.

The second straight line that extends from the origin and is perpendicular to the output device on a horizontal plane containing the origin is a straight line connecting the origin O and a point Q shown in FIG. 6A, which will be described later. Specifically, when the output device is a device that outputs information via a display, a straight line that is perpendicular to a display surface can be regarded as a straight line that is perpendicular to the output device. In addition, for example, when the output device is a device that output information by voice, an output direction on the horizontal plane (or, if the output direction spreads, a sum of subdivided output directions or vectors) can be regarded as a straight line perpendicular to the output device.

According to an aspect of the invention, an information control apparatus may include an output device configured to output information; a detection device configured to detect a position of a user who uses information outputted by the output device; a map storage device configured to divide a specified area based on the output device into a plurality of sections and store a map which is created to classify the sections into any of predetermine classes; a judgment device configured to judge the class of a section where the user is present based on the map stored by the map storage device and a result by the detection device when the user is present in the specified area; and a control device configured to control the output device to output an amount of information commensurate with the class judged by the judgment device when the user is present in the specified area.

Thus, according to the information control apparatus, information can be outputted in consideration with a distance between the output device and the user who uses the information outputted by the output device. The information control apparatus can output the contents of the information in such a manner that the user, who is at a distance from the output device, can recognize it. The amount of information commensurate with each class can be determined in advance.

According to an aspect of the invention, the information control apparatus may further include a print device configured to print the information outputted by the output device; and a print instruction input device configured to instruct the print device on a print of information outputted by the output device.

Thus, according to the information control apparatus, the user can obtain and maintain useful information outputted by the output device, and make use of the useful information after the user is away from the output device, without need to neither keep in mind nor take notes. In addition, the user can easily access an information source based on the printed information.

First Embodiment

A first embodiment of an information output apparatus of the invention will be described with reference to drawings.

As shown in FIG. 1, an information output apparatus 1 includes a control unit 2, an information storage unit 3, a display unit 4, a position detection unit 5, a contact sensing unit 6, and a print unit 7. The control unit 2 is provided with a CPU, a ROM, and a RAM, and controls each operation of the information output apparatus 1 (the entire of the information output apparatus 1). The information storage unit 3 includes a hard disk or a large capacity storage medium designed to store various kinds of information that will be provided to a user 8. The display unit 4 displays various kinds of information that is stored in the information storage unit 3 and will be provided to the user 8. The position detection unit 5 detects the presence or absence of the user 8, who uses information displayed by the display unit 4, in areas A and B determined at intervals of a specified distance from the display unit 4, and determines the area where the user 8 is present when it determines the presence of the user 8. The contact sensing unit 6 detects that the user 8 has touched the display unit 4 or stretches his or her hand toward the display unit 4 at a position where his or her hand almost touches the display unit 4 (hereinafter this is also referred to as "touching"). The print unit 7 prints information relating to the use of the user 8 (including information that the user 8 currently sees and the entirety including the information). It is appreciated that areas A and B are illustrative. Other areas may or may not be included as well. For example, additional areas C and D (and others) may also be used (relating to additional distances and/or angles, as described below, from output apparatus 1).

Each kind of information provided to the user 8 is received by the control unit 2 via a telecommunication circuit, and the control unit 2 is designed to control the information storage unit 3 to store each kind of information received by the control unit 2. The contact sensing unit 6 has a function as a print command input device that is used for entering a command to print information by the print unit 7. When the control unit 2 detects that the user 8 has touched the display unit 4 based on an input signal from the contact sensing unit 6, it enters a print command into the print unit 7. Thus, in the information output apparatus 1, information is printed in the print unit 7. The position detection unit 5 includes a known optical sensor.

Figure 2:
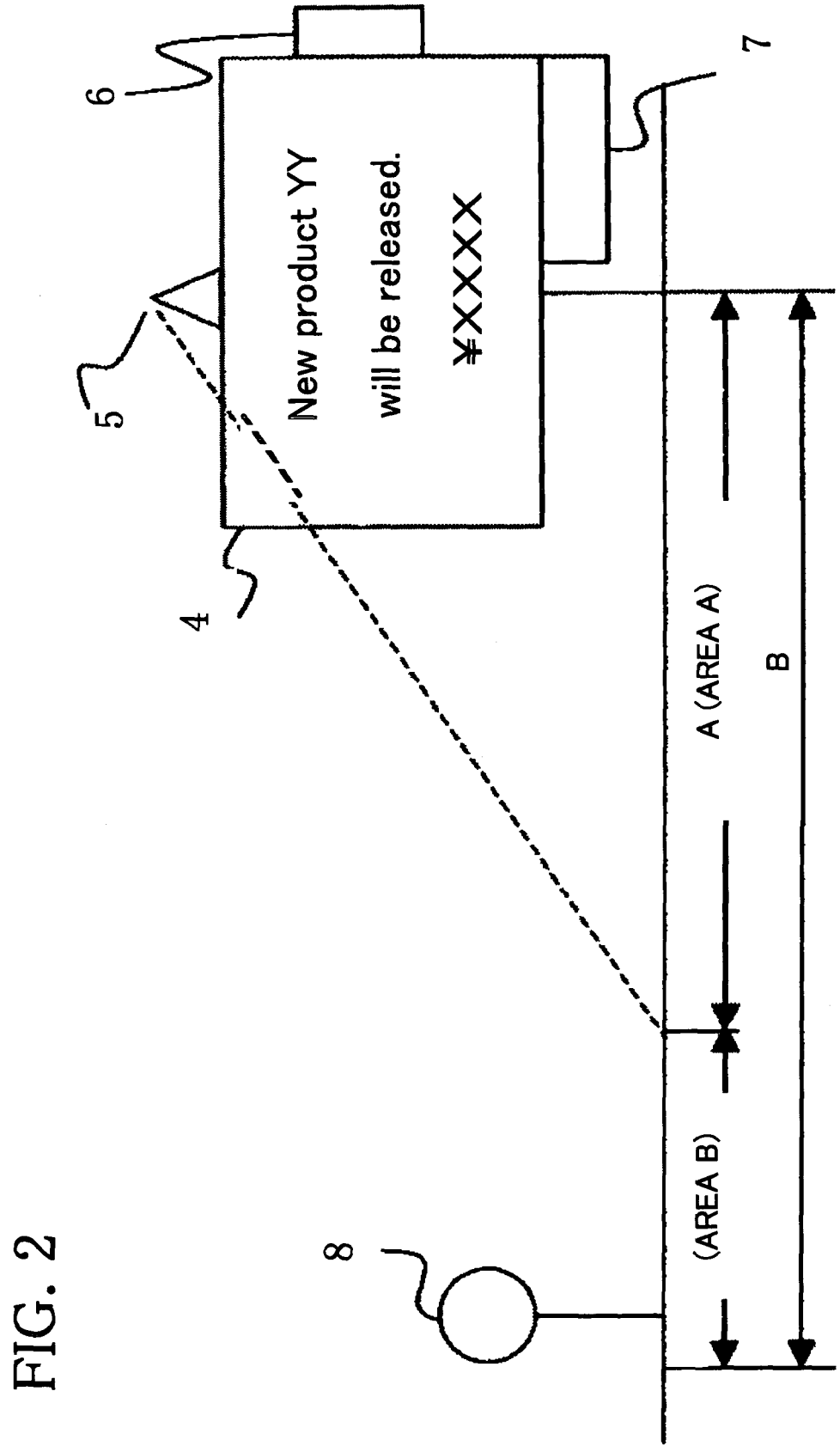
FIG. 2 shows an example of information shown in a display unit 4 when a user 8 is away from the display unit 4 according to a first embodiment of the invention.

FIG. 2 shows that the user 8 is receiving information from the display unit 4 when the user 8 is away from the display unit 4. Under the circumstances shown in FIG. 2, based on an input signal from the position detection unit 5 (the above determination results), the control unit 2 determines that the user 8 is present in the area B at a specified distance (for example, 5-15 m) away from the display unit 4, and causes the display unit 4 to display a headline of information as outline contents, so that the user can recognize the overview of the information even at a distance from the display unit 4. As a headline, "New product YY will be released. ¥XXXX" will be displayed in the display unit 4 for an example.

When the user 8 is not in the area A nor B, one of the following structures can be adopted: a structure of displaying only a headline of the information in the display unit 4 in a display mode when it is assumed that the user 8 is present in the area B; and a structure of displaying no information in the display unit 4. In the latter structure, power can be saved.

If the display unit 4 is designed in such a manner as to display information by scrolling, instead of displaying the outline contents, information may be presented in an easy-to-read manner for the user 8 who is at the distance by setting the scroll speed to low (e.g. 15 sec./page) to reduce the amount of information to be displayed in the display unit 4 per unit time. Alternatively, if the display unit 4 is designed to display information by changing it periodically, information may be presented in an easy-to-read manner for the user 8 who is at the distance by prolonging the period of the display unit 4 (e.g. 15 sec./page) to reduce the amount of information to be displayed in the display unit 4 per unit time.

Figure 3:
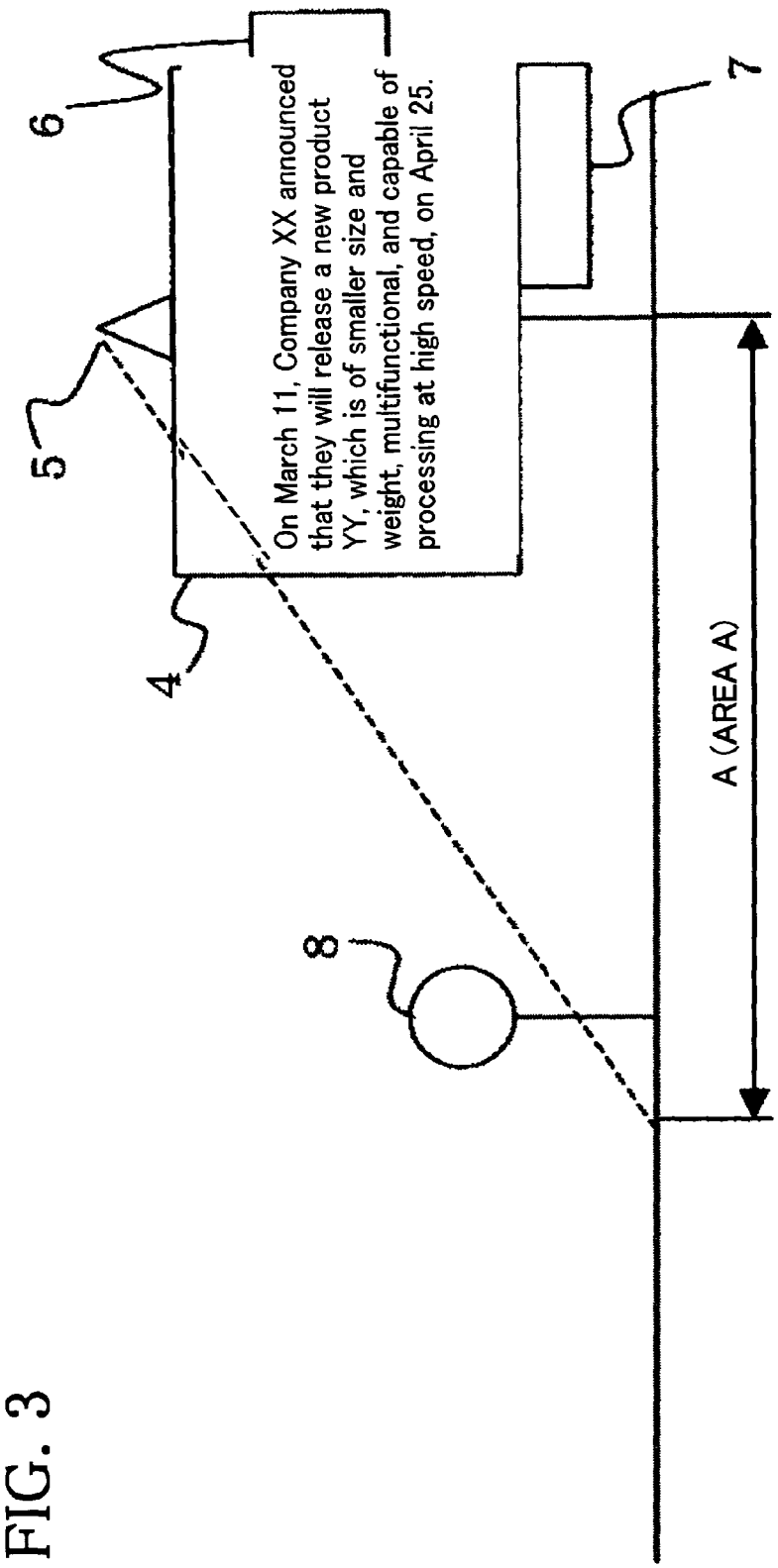
FIG. 3 shows an example of information shown in the display unit 4 when the user 8 comes near the display unit 4 according to the first embodiment.

FIG. 3 illustrates that the user 8 is about to receive provision of information from the display unit 4 when the user 8 is near the display unit 4.

Under the circumstances shown in FIG. 3, based on an input signal from the position detection unit 5, the control unit 2 determines that the user 8 is present in the area A at a specified distance (e.g. 0-5 m) away from the display unit 4. To show the detailed information to the user 8 who is near the display unit 4, the control unit 2 causes the display unit 4 to display detailed contents of information regarding the headline, for example, "On March 11, Company XX announced that they will release a new product YY, which is of smaller size and weight, multifunctional, and capable of processing at high speed, on April 25."

If the display unit 4 is designed to display the information by scrolling, information may be presented quickly for the user 8 who is near the display unit 4 by raising the scrolling speed (e.g. 10 sec./page) to increase the amount of information to be displayed in the display unit 4 per unit time. Alternatively, if the display unit 4 is designed to display information by changing it periodically, information may be presented quickly for the user 8 who is near the display unit 4 by shortening a period of the display unit 4 (e.g. intervals of 10 sec./page) to increase the amount of information to be displayed in the display unit 4 per unit time.

Figure 4:
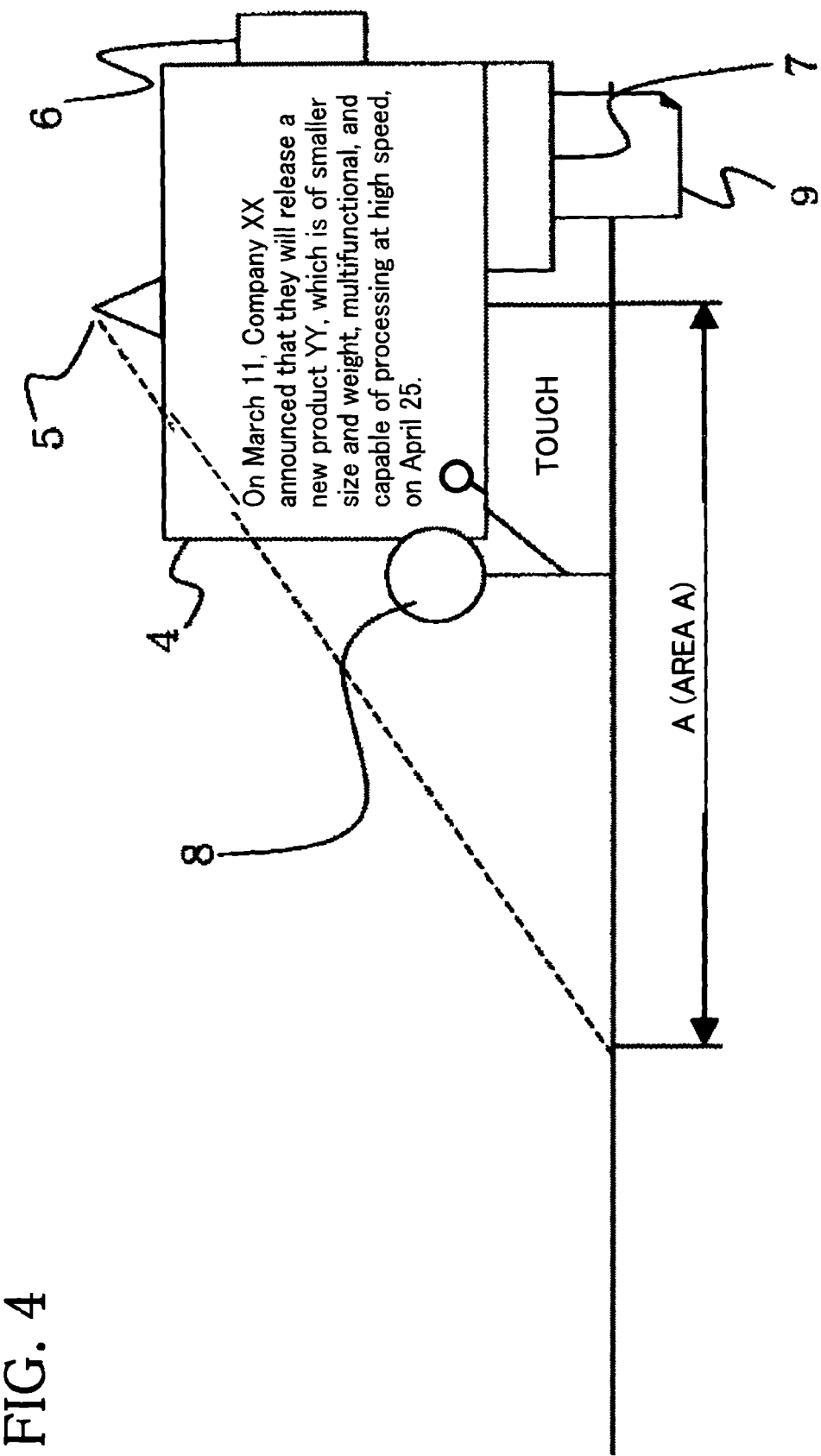
FIG. 4 shows that the user 8 touches the display unit 4 and information shown in the display unit 4 is printed.

FIG. 4 illustrates that information displayed in the display unit 4 is printed in accordance with a printing instruction of the user 8. The user 8 touches the display unit 4 as described above, the contact sensing unit 6 inputs a signal indicating a contact detected by the contact sensing unit 6 into the control unit 2, and then the control unit 2 inputs a print command into the print unit 7, so that printing is executed.

Alternatively, the information output apparatus 1 may be configured so that an area sensor (not shown) detects that the user 8 stretches his or her hand toward the display unit 4 at a position the hand almost touches the display unit 4 and assumes that the user 8 has touched the display unit 4, the control unit 2 inputs a command to print information into the print unit 7, and the print unit 7 executes printing. In this case, the display unit 4 can be kept clean because printing is started even when the user 8 does not touch the display unit 4 directly.

As to information to be printed, information displayed when the user 8 touches the display unit 4 may be printed. In addition, for example, following the information shown in FIG. 2, which is displayed in the display unit 4 when the user 8 is away from the display unit 4, information shown in FIG. 3 (FIG. 4), which is displayed in the display unit 4 when the user 8 comes near of the display unit 4, may be printed. That is, a hierarchical set of information associated with one theme may be printed. Considering that the user 8 carries a printed material 9 and uses information contained in the printed material 9, the information output apparatus 1 is preferably structured so that the user 8 can select information to be printed.

In the above description, only the areas A and B, which are determined by the distance from the display unit 4, are used as a point of reference. However, it is preferable that a distance from the display unit 4 serving as the reference is divided into area A (e.g. 0-5 m), area B (e.g. 5-15 m), and area C (e.g. 15-30 m).

According to the above structure, the information output apparatus 1 can be structured so that, for example, a headline is displayed in the display unit 4 when the user 8 is in a position where the distance from the display unit 4 is more than 15 m and less than 30 m, an abstract is displayed in the display unit 4 when the user 8 is in a position where the distance from the display unit 4 is more than 5 m and less than 15 m, and full text is displayed in the display unit 4 when the user 8 is in a position where the distance from the display unit 4 is more than 15 m and less than 30 m. Thus, according to this structure, the user 8 can be brought to recognize a good deal of information as much as possible in view of the distance between the user 8 and the display unit 4. If the information output apparatus is configured so as to print full text when the user 8 touches the display unit 4 while the full text is displayed, information can be portably provided to the user 8.

In this embodiment, the information output apparatus 1 is configured so that the position detection unit 5 determines the presence or absence of the user 8 who uses information displayed in the display unit 4, and then determines an area where the user 8 is present when it determines the presence of the user 8 (in other words, when the position detection unit 5 determines whether the user 8 is in any one of the areas determined by the distance from the display unit 4). However, the information apparatus 1 may be configured so that the position detection unit 5 measures the distance from the display unit 4 to the user 8 when it determines the presence of the user 8, and provides the measured result to the control unit 2.

Second Embodiment

Figure 5:
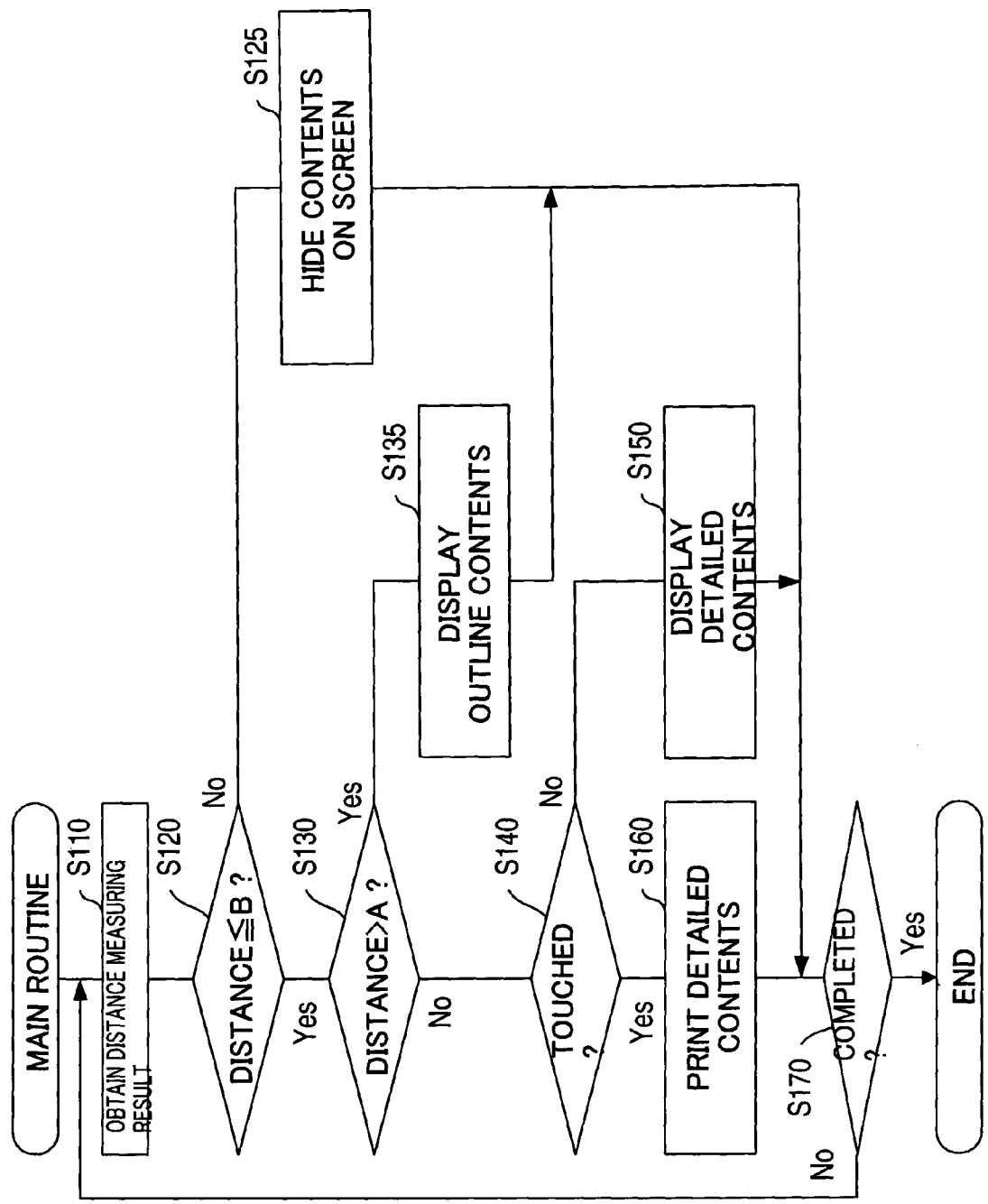
FIG. 5 is a flowchart showing a main routine executed by a control unit 2 according to a second embodiment.

In a second embodiment, the information output apparatus 1 is configured so that the position detection unit 5 measures a distance from the display unit 4 to the user 8 when it detects the presence of the user 8 who uses information displayed in the display unit 4, and inputs the measurement result in the control unit 2, and the control unit 2 executes a main routine shown in FIG. 5.

When the control unit 2 executes the main routine shown in FIG. 5, it obtains the measurement result from the position detection unit 5 at S110. At S120, based on the obtained measurement result, the control unit 2 determines whether the user 8 is within the distance B from the display unit 4. Specifically, the control unit 2 determines "No" at S120 when the measurement result obtained from the position detection unit 5 indicates that the user 8 is away from the distance B, and determines "Yes" at S120 when the measurement result indicates that the user 8 is within the distance B. In addition, when the control unit 2 obtains a measurement result indicating the absence of the user 8, it assumes that the user 8 is away from the distance B, and determines "No" at S120.

The position detection unit 5 may be configured to measure the distance between the display unit 4 and the user 8 with respect to a vertical direction to a display surface of the display unit 4 placed on a horizontal plane, or to measure a distance from a center (origin O, shown in FIG. 6) of the display surface of the display unit 4. In the case of measuring the distance from the center (origin O) of the display unit 4, the determination at S120 is made as to whether the user 8 is within a radius B from the center (origin O) of the display unit 4.

When the control unit 2 determines "No" at S120, flow proceeds to S125 where the control unit 2 hides the contents on the screen of the display unit 4. After that, flow proceeds to S170, and the control unit 2 determines whether an instruction to end the main routine is entered from an external through the power-off operation, F for example. When the instruction to end the main routine is entered (S170: Yes), the control unit 2 ends the main routine. When the instruction is not entered (S170: No), flow proceeds to S110 again where the control unit 2 obtains the newest measurement result from the position detection unit 5.

When the control unit 2 determines "Yes" at S120, flow proceeds to S130 where the control unit 2 determines, based on the measurement result, whether the distance between the display unit 4 and the user 8 is greater than distance A (A<measured distance≦B).

When the measurement result (distance) by the position detection unit 5 satisfies the inequality "A<measured distance≦B", the control unit 2 determines "Yes" at S130, flow proceeds to S135 where the control unit 2 allows the display unit 4 to display outline contents. The headline shown in FIG. 2 is included as the outline contents.

When the outline contents, which are few in the amount of information but easy for the user 8 to recognize, are displayed in the display unit 4, flow proceeds to S170. If the instruction to end is not entered, flow proceeds to S110 where the control unit 2 obtains the newest measurement result from the position detection unit 5 again.

When the measurement result (distance) by the position detection unit 5 does not satisfy the inequality "A<measured distance≦B" (S130: No), the user 8 is within the distance A from the display unit 4, and flow proceeds to S140 where the control unit 2 determines, based on the input signal from the contact sensing unit 6, whether the user 8 touches the display unit 4. If the control unit 2 determines that the user 8 does not touch the display unit 4 (S140: No), flow proceeds to S150 where the control unit 2 allows the display unit 4 to display detailed contents. As the detailed contents, the detailed information, which has much information compared with the headline, is included.

In this way, when the contents having much information compared with the outline contents, are displayed in the display unit 4, flow proceeds to S170. If the instruction to end is not entered, flow proceeds to S110 where the control unit 2 obtains the newest measurement result from the position detection unit 5 again.

When the control unit 2 determines that the user 8 touches the display unit 4 at S140 (S140: Yes), flow proceeds to S160 where the control unit 2 enters an instruction to print the detailed contents into the print unit 7. Thus, a printed output of the detailed contents is produced in the print unit 7, and a printed material 9 is provided to the user 8. Before it is determined as "Yes" at S140, it is generally determined as "No" at S140 and the detailed contents are displayed in the display unit 4. Thus, at S160, the detailed contents displayed in the display unit 4 are printed.

After a step at S160 is completed, the control unit 2 makes a determination at S170. If the instruction to end is not entered, flow proceeds to S110. If the instruction to end is entered, the control unit 2 ends the main routine.

Up to this point, the information output apparatus 1 of the second embodiment has been described. This information output apparatus 1 has a similar function as that of the first embodiment, in which a display mode for displaying information is changed based on a determination as to whether the user 8 is in one of a number of areas defined by the distance from the display unit 4.

Namely, according to the information output apparatus 1, if information to be displayed is one that is shown in one of FIGS. 2, 3, and 4, a distance measured by the position detection unit 5 is compared with the distance A defined as a threshold value for displaying a headline or detailed information. When the distance measured by the position detection unit 5 is greater than the distance A, the display mode of the display unit 4 is set to headline (refer to FIG. 2). When it is equal to or below the distance A, detailed information (refer to FIG. 3) is displayed. As is the case with the first embodiment, it is possible to display information in the display unit 4 in consideration of the distance between the user 8, who uses the information, and the display unit 4, and in an easy-to-recognize manner for the user 8 in accordance with the location of the user 8.

Even in the second embodiment, a number of distances such as A, B, and C can be defined as threshold values. In this case, the user 8 can be brought to recognize information as much as possible in consideration of the distance between the user 8 and the display unit 4.

The above descriptions have been made as to the embodiments where the display mode is changed in accordance with the distance between the user 8 and the display unit 4. However, if the display unit 4 includes a liquid crystal display (LCD), it may be difficult for the user 8 to recognize information depending on an angle formed by the display surface and a user's line of sight. Thus, the information output apparatus 1 may be configured to change the display mode (the amount of information) depending on the angle formed by the display surface and the user's line of sight.

Third Embodiment

The information output apparatus 1 of a third embodiment is configured to change the display mode in consideration of characteristics of the display unit 4 as well as the distance between the user 8 and the display unit 4, so that the user 8 can recognize information with reliability. Specifically, the display mode is determined based on two factors, the distance and the viewing angle of the display unit 4. This function is exerted especially when the display unit 4 is a LCD having a narrow viewing angle.

Figure 6A:
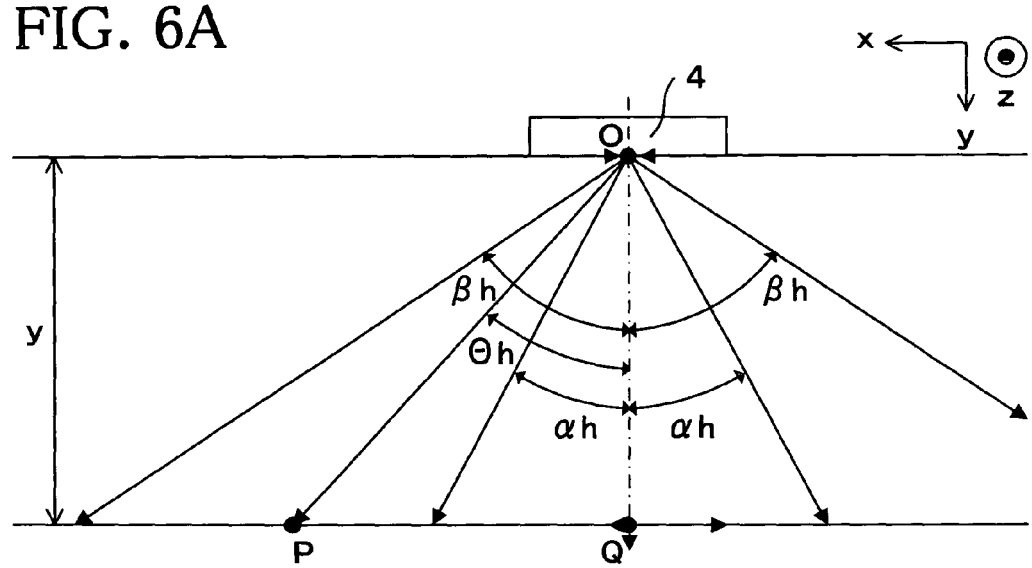
FIG. 6A illustrates a positional relationship between the user 8 and the display unit 4 in a horizontal direction.

FIG. 6A is a plan view showing a positional relationship between the user 8 and the display unit 4 (a view when viewing the positional relationship between the user 8 and the display unit 4 shown in FIG. 2 from above), and illustrates a relationship among the display unit 4, an origin O and angles αh, βh, and θh on a horizontal plane. A point P in FIG. 6A indicates a position of the user 8 (for example, a center of a pair of eyes of the user 8).

In FIG. 6A, a specified position on the display surface of the display unit 4 (a center in a horizontal direction of this embodiment) is regarded as the origin O of the display unit 4. Characteristically, the display unit 4 has a horizontal viewing angle 2βh. The angle θh is defined by a line OP and a line OQ. The line OP connects the origin O and the point P where the user 8 is present on a horizontal plane containing the origin O. The line OQ extends from the origin O and is perpendicular to the display unit 4 on the horizontal plane containing the origin O.

If the angle θh is enough smaller than the angle βh and the user 8 is within the distance A from the display unit 4, the user 8 can recognize even the detailed information displayed in the display unit 4 as shown in FIG. 3, as with the case where the user 8 is in position Q.

On the other hand, if the angle θh is approximate to the angle βh (provided the angle θh<the angle βh), the user 8 might see the information such as characters displayed in the display unit 4, however, it will be difficult for the user 8 to recognize the information accurately.

In the third embodiment, a relationship between the amount of information (information granularity or the number of pieces of information) and a limit angle where the user 8 can manage to recognize the information is experimentally found in advance, so that a threshold αh for displaying the detailed contents (the detailed information) is determined (provided αh≦βh). If the angle θh is greater than the threshold αh, the control unit 2 controls the display unit 4 to display the outline contents (headline) as shown in FIG. 2 preferentially even when the user 8 is within the distance A from the display unit 4.

Figure 6B:
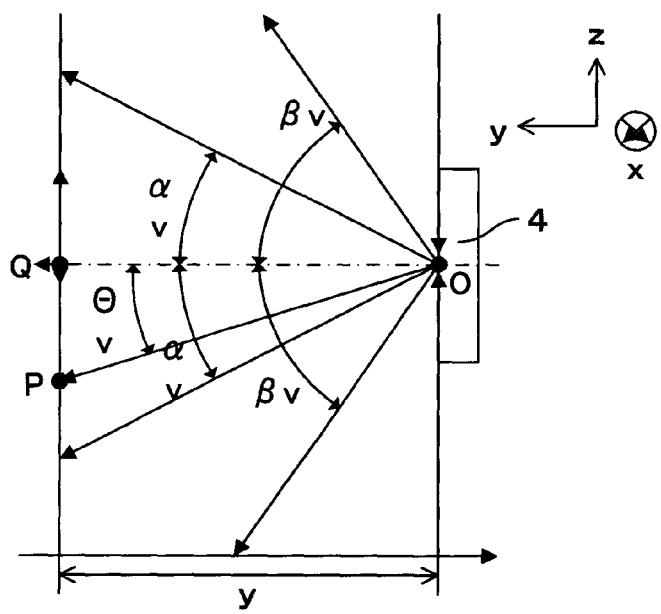
FIG. 6B illustrates a positional relationship between the user 8 and the display unit 4 in a vertical direction.

In the third embodiment, a threshold αv is set with respect to an angle θv in a vertical direction. FIG. 6B is a plan view showing a positional relationship between the user 8 and the display unit 4 (for example, a view when viewing the positional relationship between the user 8 and the display unit 4 in FIG. 2 from a side), and illustrates a relationship among the display unit 4, the origin O, and angles αv, βv, and θv on a plane perpendicular to the horizontal plane (hereinafter referred to as a vertical plane). A point P indicates a position of the user 8 (the eyes of the user 8, for example), which is projected on the vertical plane containing the origin O.

In FIG. 6B, a specified position on the display surface of the display unit 4 (a center in the vertical direction in this embodiment) is regarded as the origin O of the display unit 4. Characteristically, the display unit 4 has a vertical viewing angle 2βv. A line OQ is a line that connects the origin O and a point Q that extends from the origin O and is perpendicular to the display surface. On the vertical plane, the line OP that connects the origin O and the point P and a line that extends from the origin O and is perpendicular to the display surface (that is equal to the line OQ when the display surface is oriented vertically) form an angle θv. In one aspect, the vertical viewing angle may be relevant to a height at which a user is viewing the display unit 4 (for instance, with respect to a display unit 4 viewable from multiple floors of a building). In another aspect, the vertical viewing angle may be relevant to the height of the user viewing the display unit 4 (for instance, an adult having a height of 2 meters compared to that of a child having a height of 1 meter).

In the third embodiment, as is the case with the threshold αh, a relationship between the amount of information (information granularity or the number of pieces of information) and a limit angle where the user 8 can manage to recognize the information is experimentally found in advance, so that the threshold αv in the vertical direction for displaying the detailed contents (the detailed information) is determined (provided αv≦βv). If the angle θv is greater than the threshold αv, the control unit 2 controls the display unit 4 to display the outline contents (headline) as shown in FIG. 2 preferentially even when the user 8 is within the distance A from the display unit 4.

To realize this kind of control, the position detection unit 5 of the third embodiment is equipped with a function to measure the angles θh and θv as well as the function to measure the distance shown in the second embodiment. In addition, the control unit 2 is configured so as to execute a contents display change process shown in FIG. 7, at S150 of the main routine shown in FIG. 5.

Figure 7:
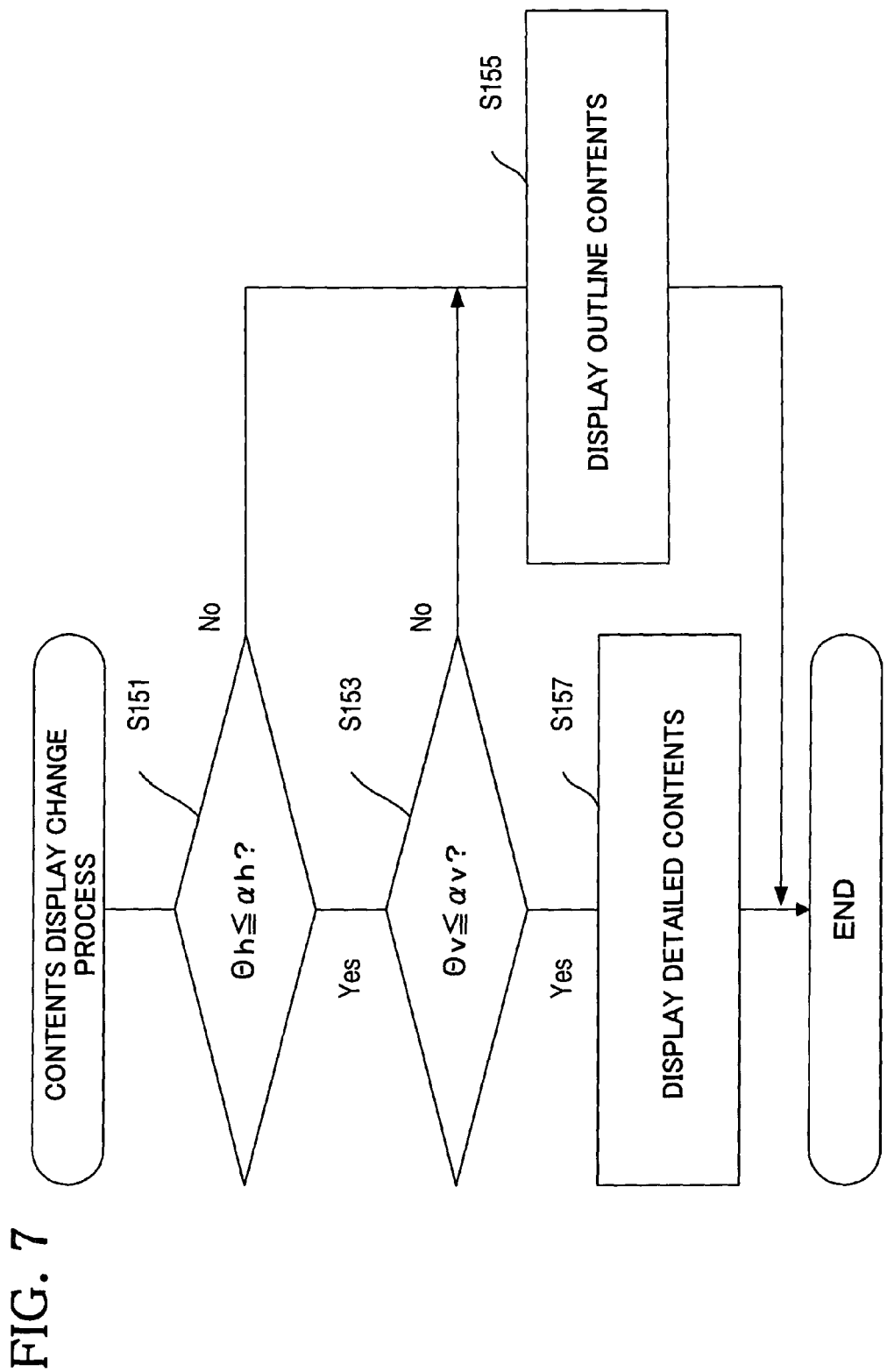
FIG. 7 is a flowchart showing display a contents display change process executed by the control unit 2 according to a third embodiment.

In other words, the information output apparatus 1 of the third embodiment is completed with the control unit 2 of the information output apparatus 1 of the second embodiment that is configured so as to execute the contents display change process shown in FIG. 7 at S150, and the position detection unit 5 that is configured so as to output measurement results including angles θh and θv. Thus, the following description will be made on the contents display change process in detail. In the information output apparatus 1 of the first embodiment, when it is determined that the user 8 is within the area A predetermined by a distance from the display unit 4 (e.g. 0-5 m) based on an input signal from the position detection unit 5, the contents display change process may be executed by the control unit 2.

FIG. 7 is a flowchart where the control unit 2 executes the contents display change process at S1150. When the contents display change process is executed, the control unit 2 determines whether the angle θh, which is a measurement result by the position detection unit 5, is smaller than or equal to the angle αh at S151. When the angle θh is not smaller than nor equal to the angle αh (when the angle θh is greater than the angle αh) (S151: No), the control unit 2 causes the display unit 4 to display the outline contents (headline) at S155. Then, the contents display change process is ended.

On the other hand, when the angle θh is smaller than or equal to the angle αh (S151: Yes), flow proceeds to S153 where the control unit 2 determines whether the angle θv is smaller than or equal to the angle αv. When the angle θv is not smaller than nor equal to the angle αv (when the angle θv is greater than the angle αv) (S153: No), the control unit 2 causes the display unit 4 to display outline contents (headline) at S155. Then the contents display change process is ended.

When it is determined that the angle θv is smaller than or equal to the angle αv (S153: Yes), both inequalities "θh≦αh" and "θv≦αv" are satisfied. Thus, flow proceeds to S157 where the control unit 2 causes the display unit 4 to display the detailed contents (detailed information). Then the contents display change process is ended.

According to the information output apparatus 1, if the position of the user 8 does not satisfy "θh≦αh" or "θv≦αv", the outline contents are preferentially displayed in the display unit 4. Thus, even when it is difficult to visually recognize the contents on the display surface because of the characteristic of the display unit 4, the user 8 can be brought to recognize the information with reliability.

The viewing angle may need adjustment only in the horizontal or vertical direction of the display unit 4, depending on where the information output apparatus 1 is placed. In this case, needless to say, there is no need for control using both threshold values αh and αv in the horizontal direction and the vertical direction, respectively.

As long as the display unit 4 is configured to display information by scrolling, experimentally the relationship between the scrolling speed and the limit viewing angle may be found in advance to calculate a threshold in the horizontal or vertical direction. If the angle θ (the line of sight of the user 8) is greater than the threshold, the amount of information displayed in the display unit 4 per unit time may be decreased (to, for example, a scrolling speed of 15 sec./page), so as to enable the user 8 to recognize the information surely even when the user 8 is present in a position where it is difficult to recognize the information.

The information output apparatus 1 configured in consideration of the viewing angle is not limited to the configuration of the third embodiment, and can take another configuration.

Fourth Embodiment

The information output apparatus 1 of a fourth embodiment is configured to include a position detection apparatus that detects three dimensional position coordinates of a position corresponding to the middle of the eyes of the user 8 when the user 8, who uses information displayed in the display unit 4, is present and enter the detection result into the control unit 2. This position detection apparatus functions as the position detection unit 5. Further, the information output apparatus 1 of the fourth embodiment is configured so that the control unit 2 executes the main routine shown in FIG. 8.

Figure 8:
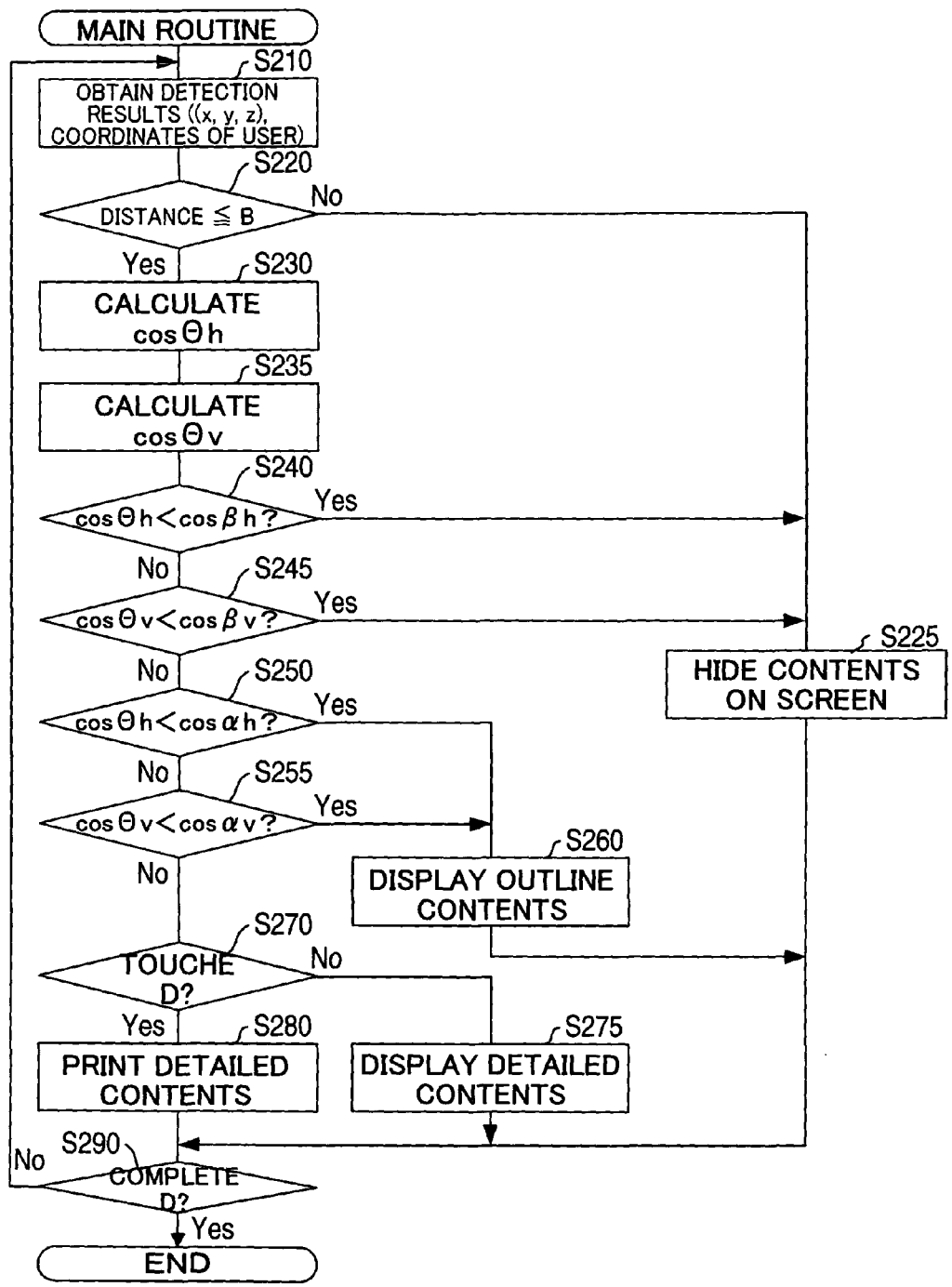
FIG. 8 is a flowchart showing a main routine executed by the control unit 2 according to a fourth embodiment.

When the main routine shown in FIG. 8 is executed, the control unit 2 obtains a detection result from the position detection unit 5 at S210. As the detection result, the position detection unit 5 outputs three-dimensional position coordinates of the user 8 when the user 8 is present, and outputs information indicating the absence of the user 8 when the user 8 is not present.

When the control unit 2 obtains the detection result from the position detection unit 5 at S210, flow proceeds to S220 where the control unit 2 determines whether the user 8 is within the distance B from the display unit 4 based on the detection result. Specifically, the control unit 2 determines "No" at S220 when the detection result obtained from the position detection unit 5 indicates that the user 8 is away from the distance B, and determines "Yes" at S220 when the detection result indicates that the user 8 is within the distance B. In addition, when the control unit 2 obtains a detection result indicating the absence of the user 8 from the position detection unit 5, it assumes that the user 8 is away from the distance B, and determines "No" at S220.

In the fourth embodiment, when the control unit 2 obtains the three dimensional position coordinates (x, y, z) of the user 8 as the detection result from the position detection unit 5, it determines whether the y-coordinate value, which indicates a distance in the vertical direction with respect to the display surface of the display unit 4 on a horizontal plane, is smaller than or equal to the value B, so as to determine whether the user 8 is within the distance B from the display unit 4. However, the control unit 2 can be configured to find a distance given by the expression $(x^2+y^2+z^2)^{1/2}$ based on the three-dimensional position coordinates (x, y, z) of the user 8, determine whether the distance has a value smaller than or equal to the value B, and then determine whether the user 8 is within the distance B from the display unit 4.

In the fourth embodiment, the center of the display surface of the display unit 4 is determined as the origin O and the yz plane is provided vertically to the display surface of the display unit 4, the z-axis is provided in a height direction, and the x-axis and the y-axis are provided on a horizontal plane. The x-axis is provided along the display surface. Specifically, the x-axis, the y-axis, and the z-axis are determined as shown in FIGS. 6A and 6B. In the fourth embodiment, the point P shown in FIGS. 6A and 6B indicates the three dimensional position coordinates (x, y, z) of the user 8, and the point Q indicates the coordinates (0, B, 0).

When the control unit 2 determines "No" at S220, flow proceeds to S225 where the control unit 2 causes the contents shown on the screen of the display unit 4 to be hidden. Then, flow proceeds to S290 where the control unit 2 determines whether an instruction to end the main routine is entered from an external through the power-off operation, for example. When the instruction to end the main routine is entered (S290: Yes), the control unit 2 ends the main routine. When the instruction is not entered (S290: No), flow returns to S210 where the control unit 2 obtains the newest detection result from the position detection unit 5.

On the other hand, when the control unit 2 determines "Yes" at S220, flow proceeds to S230 where the control unit 2 finds the angle θh formed by the reference line OQ on the xy plane and the line connecting the origin O and the position P indicating the user 8 (in other words, vector Vh (x, y, 0)) based on the three dimensional position coordinates (x, y, z) of the user 8 the detection result indicates. In the fourth embodiment, the angle θh is replaced with a cosine value.

$$\cos \theta h = y/|Vh|$$

$$|Vh| = (x^2 + y^2)^{1/2}$$

After the process at S230, flow proceeds to S235 where the control unit 2 finds the angle θv formed by a vector V (0, α, β) vertically extending from the origin O to the display surface on the yz plane and the line connecting the origin O and the point P indicating the position of the user 8 on the yz plane (in other words, vector Vv (0, y, z)) based on the three dimensional position coordinates (x, y, z) of the user 8 the detection result indicates. In the fourth embodiment, the angle θv is replaced with a cosine value.

$$\cos \theta v = (\alpha \cdot y + \beta \cdot z)/((\alpha^2 + \beta^2)^{1/2} \cdot |Vv|)$$

$$|Vv| = (y^2 + z^2)^{1/2}$$

After the process at S235, flow proceeds to S240 where the control unit 2 compares the predetermined angle βh with the angle θh using the cosine value, and determines whether cos θh is smaller than cos βh (cos θh<cos βh). When the control unit 2 determines that cos θh is smaller than cos βh (S240: Yes), it means that the angle θh shown in FIG. 6A is greater than the angle βh. Thus, flow proceeds to S225 where the control unit 2 causes the contents shown on the screen of the display unit 4 to be hidden. Then, flow proceeds to S290.

On the other hand, when the control unit 2 determines that cos θh is greater than or equal to cos βh (S240: No), flow proceeds to S245 where the control unit 2 compares the predetermined angle βv with the angle θv using the cosine value. Specifically, the control unit 2 determines whether cos θv is smaller than cos βv (cos θv<cos βv). When the control unit 2 determines that cos θv is smaller than cos βv (S245: Yes), it means that the angle θv shown in FIG. 6B is greater than the angle βv. Thus, flow proceeds to S225 where the control unit 2 causes the contents shown on the screen of the display unit 4 to be hidden. Then, flow proceeds to S290.

In addition, when the control unit 2 determines that cos θv is greater than or equal to cos βv (S245: No), flow proceeds to S250 where the control unit 2 compares the predetermined angle αh with the angle θh using the cosine value, and determines whether cos θh is smaller than cos αh (cos θh<cos αh). In the fourth embodiment, the angles αh and βh are predetermined so as to establish cos αh>cos βh.

When the control unit 2 determines that cos θh is smaller than cos αh (S250: Yes), it means that the angle θh shown in FIG. 6A is smaller than or equal to the angle βh and greater than the angle αh. Thus, flow proceeds to S260 where the control unit 2 causes the display unit 4 to display the outline contents. The outline contents include the headline shown in FIG. 2.

When the outline contents, which have a small amount of information but are easy for the user 8 to recognize, is displayed in the display unit 4, flow proceeds to S290. When the instruction to end the main routine is not entered, flow returns to S210 where the control unit 2 obtains the newest detection result from the position detection unit 5 again.

On the other hand, when the control unit 2 determines that cos θh is greater or equal to cos αh (S250: No), flow proceeds to S255 where the control unit 2 compares the predetermined angle αv with the angle θv using the cosine value. Specifically, the control unit 2 determines whether cos θv is smaller than cos αv (cos θv<cos αv). In the fourth embodiment, the angles αv and βv are predetermined so as to establish cos αv>cos βv.

When the control unit 2 determines that cos θv is smaller than cos αv (S255: Yes), it means that the angle θv shown in FIG. 6B is smaller than or equal to the angle βv and greater than the angle αv. Thus, flow proceeds to S260 where the control unit 2 causes the display unit 4 to display the outline contents. Then, flow proceeds to S290.

When the control unit 2 determines that cos θv is greater than or equal to cos αv (S255: No), it means the angle θh is smaller than or equal to the angle αh and the angle θv is smaller than or equal to the angle αv. Thus, flow proceeds to S270 where control unit 2 determines whether the user 8 has touched the display, unit 4, based on an input signal from the contact sensing unit 6. When the control unit 2 determines that the user 8 has not touched the display unit 4 (S270: No), flow proceeds to S275 where the control unit 2 causes the display unit 4 to display the detailed contents. The detailed contents include detailed information shown in FIG. 3 that has more information than the headline.

When the detailed contents, which have more information than the outline contents, are displayed in the display unit 4, flow proceeds to S290. When the instruction to end the main routine is not entered, flow returns to S210 where the control unit 2 obtains the newest detection result from the position detection unit 5 again.

On the other hand, when the control unit 2 determines that the user 8 has touched the display unit 4 (S270: Yes), flow proceeds to S280 where the control unit 2 enters a print command to print the detailed contents into the print unit 7. Thus, at the print unit 7, the detailed contents are printed, and the print material 9 is provided to the user 8. After the process at S280, the control unit 2 makes a determination at S290. When the instruction to end the main routine is not entered, flow returns to S210. When the instruction is entered, the control unit 2 ends the main routine.

According to the information output apparatus 1, the display mode of the display unit 4 is determined in consideration of the line of sight of the user 8, thereby enabling the user 8 to recognize information reliably. Namely, the angles αh, αv, βh, and βv can be determined based on the viewing angle of the display unit 4, the display mode can be changed in consideration of the characteristic of the display unit 4, and the user 8 can be brought to recognize information reliably. This effect can be further exerted especially when the display unit 4 is a liquid crystal display having a narrow viewing angle.

The display mode change in accordance with the positional relationship between the display unit 4 and the user 8 can be realized by dividing a specified area based on the display unit 4 into a number of sections, classifying each of the sections under a number of classes to generate a map, and writing the map in the information storage unit 3 in advance.

Fifth Embodiment

The information output apparatus 1 of a fifth embodiment includes a position detection apparatus configured to detect the two-dimensional position coordinates of the user 8 when the user 8, who uses information displayed in the display unit 4, is present, and enter the detection result into the control unit 2. This position detection apparatus functions as the position detection unit 4. Further, the information output apparatus 1 of the fifth embodiment is configured so that the information storage unit 3 includes a map (data file) shown in FIG. 9 and the control unit 2 executes the main routine shown in FIG. 10.

Figure 9:
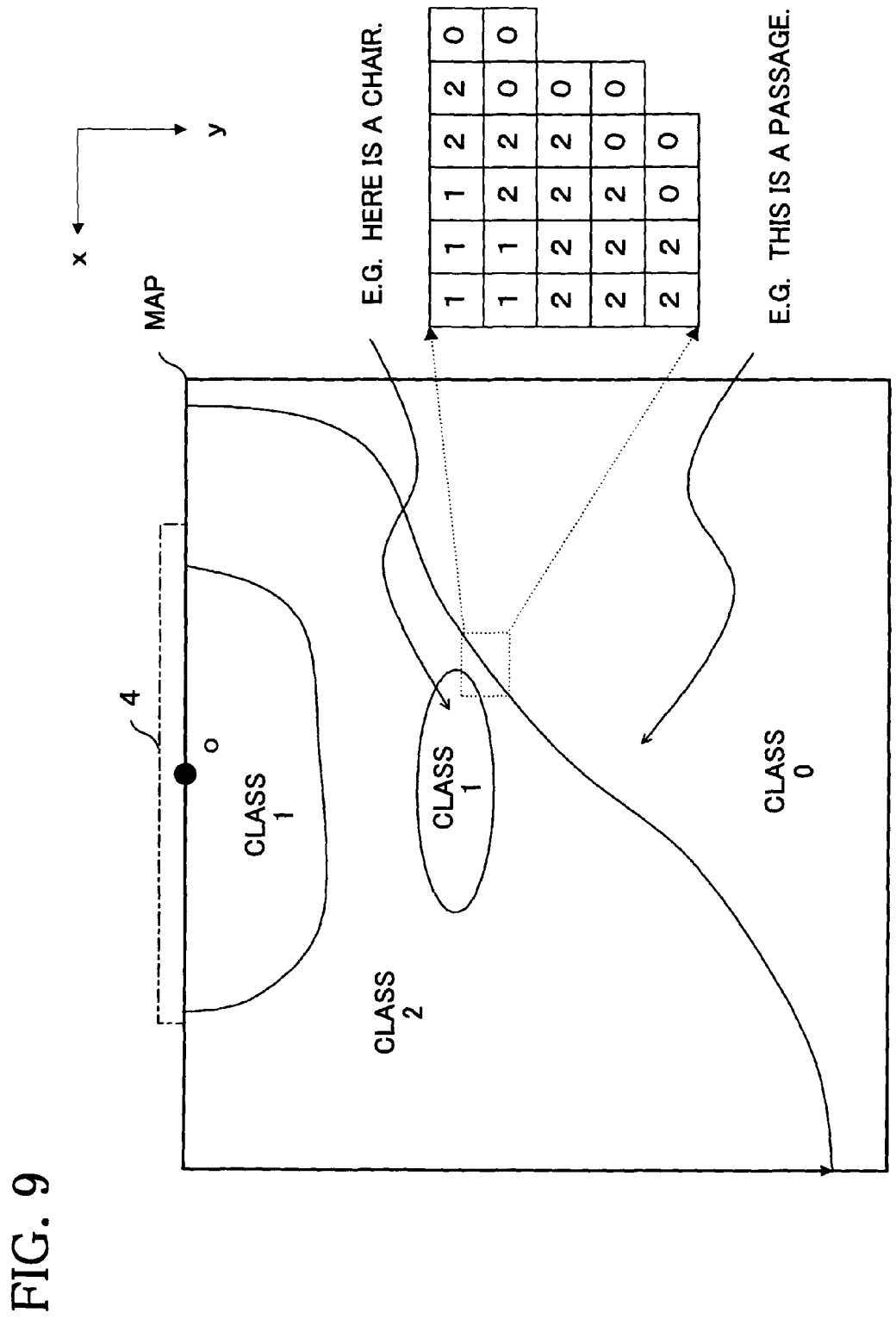
FIG. 9 illustrates a map configuration an information storage unit 3 stores according to a fifth embodiment.

A map will be described. FIG. 9 illustrates a map configuration. This map is created by classifying sections of a specified area relative to the center (the origin O) of the display surface of the display unit 4 under classes 0, 1, and 2.

In the fifth embodiment, the specified area is divided into square cells, and the sections are classified into one of classes 0, 1, and 2 in response to the surrounding environment where the display unit 4 is placed. Class 0 corresponds to a section where contents are hidden, class 1 corresponds to a section where detailed contents are displayed, and class 2 corresponds to a section where outline contents are displayed. This process should be made by an administrator prior to use of the information output apparatus 1.

For example, class 1 is allocated to an area in the neighborhood of the display unit 4 and an area where a chair is arranged, class 2 is allocated to an area somewhat away from the display unit 4, and class 0 is allocated to a well-trafficked area such as a passage. The map is generated via this process, and stored in the information storage unit 3 by a communication device.

The map can be edited on a personal computer and defined by representing class 0 section, for example, by value 0, class 1 section by value 1, and class 2 section by value 2, matching values with an arrangement of the sections.

Figure 10:
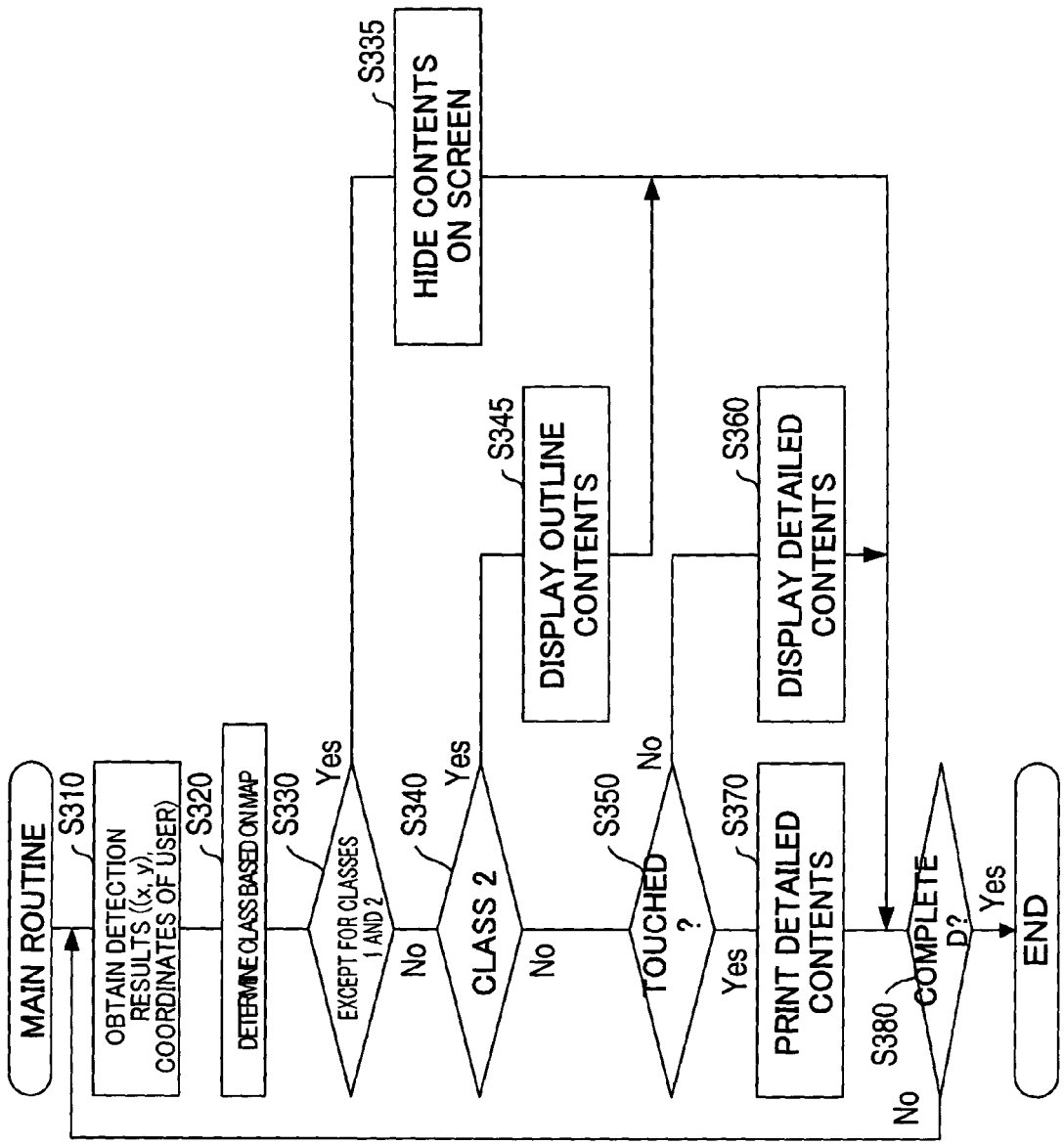
FIG. 10 is a flowchart showing a main routine executed by the control unit 2 according to the fifth embodiment.

Using the above-structured map, the control unit 2 of the information output apparatus 1 of the fifth embodiment executes a main routine shown in FIG. 10. FIG. 10 is a flowchart showing the main routine.

When the main routine is executed, the control unit 2 obtains a detection result from the position detection unit 5 (S310). As the detection result, the position detection unit 5 outputs two-dimensional position coordinates (x, y) of the user 8 when the user 8 is present, and outputs information indicating the absence of the user 8 when the user 8 is not present. In the fifth embodiment, the center of the display surface of the display unit 4 is determined as the origin O, the xy plane is provided parallel to a horizontal plane, the x-axis is provided along the display surface of the display unit 4, and the y-axis is provided in a direction perpendicular to the display surface on the horizontal plane. Specifically, the x-axis and the y-axis are determined as shown in FIG. 9.

After the process at S310, the control unit 2 determines a class of the section where the user 8 is present, based on the detection result (S320). Specifically, when the control unit 2 obtains the detection result indicating the absence of the user 8 from the position detection unit 5, it determines the section where the user 8 is present as class 0. On the other hand, when the control unit 2 obtains the two-dimensional position coordinates (x, y) of the user 8 from the position detection unit 5, it identifies a section corresponding to the coordinates (x, y) and determines the class of the identified section based on a value shown in the map.

Specifically, when the section corresponding to the coordinates (x, y) is classified in class 2 in the map, the control unit 2 determines the section where the user 8 is present as class 2. When the section corresponding to the coordinates (x, y) is classified in class 1 in the map, the control unit 2 determines the section where the user 8 is present as class 1. When the section corresponding to the coordinates (x, y) is classified in class 0 in the map, the control unit 2 determines the section where the user 8 is present as class 0.

After class determination, flow proceeds to S330 where the control unit 2 determines whether the detection result as to the section where the user 8 is present is other than class 1 and class 2 (that is, the detection result is class 0). When the control unit 2 determines that the section where the user 8 is present is other than class 1 and class 2 (that is, when it determines the section is class 0) (S330: Yes), flow proceeds to S335 where the control unit 2 causes the contents on the screen of the display unit 4 to be hidden.

Then, flow proceeds to S380 where the control unit 2 determines whether an instruction to end the main routine is entered from an external through the power-off operation, for example. When the instruction to end the main routine is entered (S380: Yes), the control unit 2 ends the main routine. When the instruction is not entered (S380: No), flow returns to S310 where the control unit 2 obtains the newest detection result from the position detection unit 5.

On the other hand, when the control unit 2 determines "No" at S330, flow proceeds to S340 where the control unit 2 determines whether the detection result indicating the section where the user 8 is present is class 2. When the control unit 2 determines the detection result indicating the section where the user 8 is present is class 2 (S340: Yes), flow proceeds to S345 where the control unit 2 causes the display unit 4 to display the outline contents. The outline contents include the headline shown in FIG. 2.

When the outline contents, which have a small amount of information but are easy for the user 8 to see, are displayed in the display unit 4, flow proceeds to S380. When the instruction to end the main routine is not entered, flow returns to S310 where the control unit 2 obtains the newest detection result from the position detection unit 5 again.

When the control unit 2 determines that the detection result indicating the section where the user 8 is present is not class 2 (that is, when it determines the detection result is class 1) (S340: No), flow proceeds to S350 where the control unit 2 determines whether the user 8 has touched the display unit 4 based on an input signal from the contact sensing unit 6. When the control unit 2 determines that the user 8 has not touched the display unit 4 (S350: No), flow proceeds to S360 where the control unit 2 causes the display unit 4, to display the detailed contents. The detailed contents include detailed information shown in FIG. 3, which has more information than the headline.

When the detailed contents, which have more information than the outline contents, are displayed in the display unit 4, flow proceeds to S380. When the instruction to end the main routine is not entered, flow returns to S310 where the control unit 2 obtains the newest detection result from the position detection unit 5 again.

On the other hand, when the control unit 2 determines that the user 8 has touched the display unit 4 (S350: Yes), flow proceeds to S370 where the control unit 2 enters a print command to print the detailed contents into the print unit 7. Thus, at the print unit 7, the detailed contents are printed, and the print material 9 is provided to the user 8. With the map structured as shown in FIG. 9, before it is determined as "Yes" at S350, it is generally determined as "No" at S350 and the detailed contents are displayed in the display unit 4. Thus, at S370, the detailed contents displayed in the display unit 4 are printed.

After the process at S370, flow proceeds to S380. When the instruction to end the main routine is not entered, flow returns to S310. When the instruction is entered, the control unit 2 ends the main routine.

According to the information output apparatus 1 of the fifth embodiment configured above, the positional relationship between the display unit 4 and the user 8 is evaluated in consideration of circumferential environment of the display unit 4, so that the display mode can be changed. Thus, information can be outputted more appropriately in such a manner that the user 8 can recognize its contents in accordance with the position of the user 8. In addition, the information output apparatus 1 is configured to print detailed contents when the user 8 touches the display unit 4, so that information can be portably provided to the user 8.

Figure 11A:
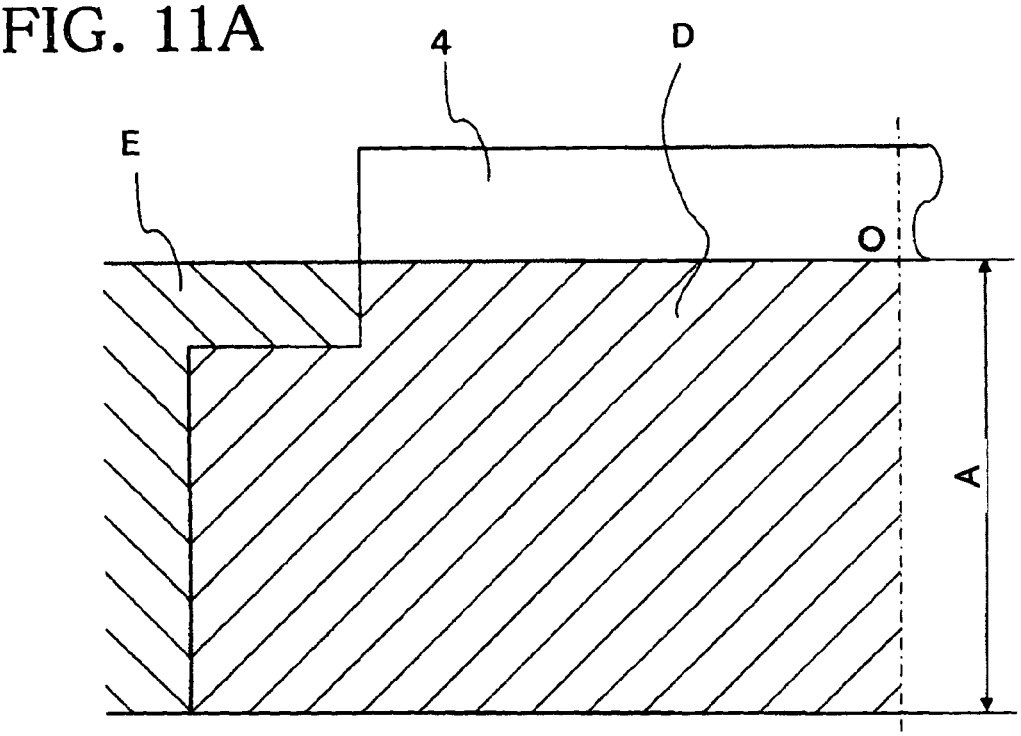
FIGS. 11A and 11B are plan views showing an area where detailed information is displayed when the user 8 is close to the display unit 4 in an alternative embodiment.
Figure 11B:
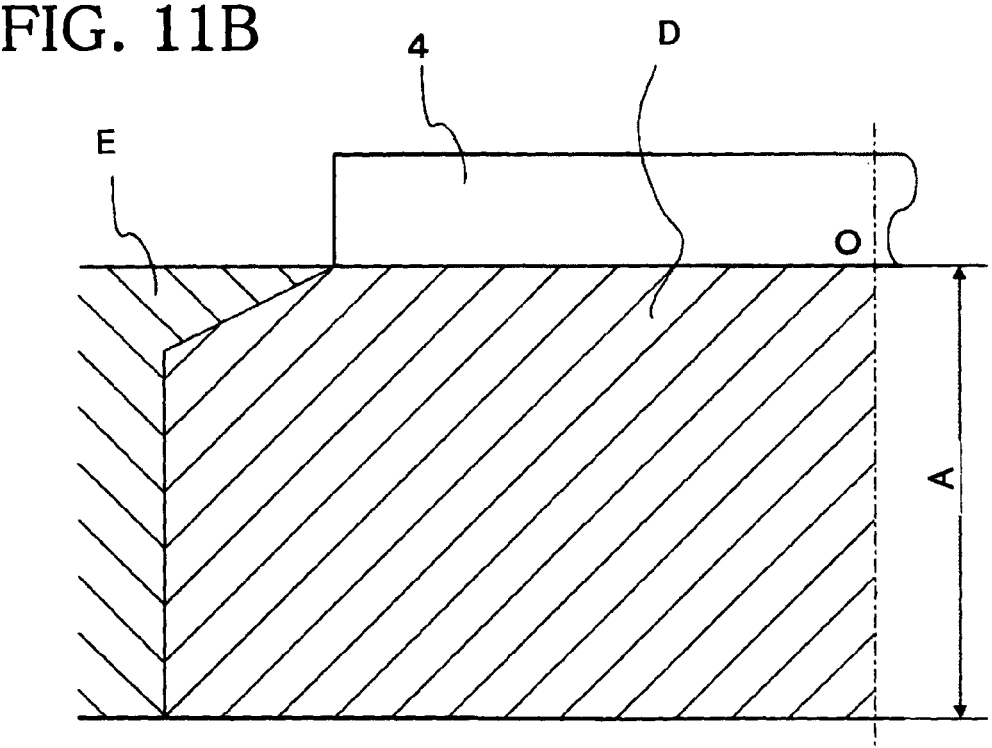

The embodiment using the map is not limited to the fifth embodiment, and can be provided in various embodiments. For example, within the area A of the first embodiment, an area D where the contents are fully recognizable may be predetermined as shown in FIGS. 11A and 11B. As long as the user 8 is present in the area D, the control unit 2 may control the display unit 4 to display the contents shown in FIG. 3. When the user 8 is in an area E, the control unit 2 may control the display unit 4 to display outline contents.

In the information output apparatus 1 in the first through fifth embodiments, the control unit 2 can be controlled so as to increase the amount of information, which is to be displayed in the display unit 4, every time a specified time passes, as long as the user 8 who uses the information stays in the position where the control unit 2 determines to display a small amount of information for a specified time, with the headline displayed in the display unit 4. Namely, eyesight and hearing vary among individuals, and a user who is not present in the area A may fully recognize information to be displayed in the display unit 4. According to the above configuration, detailed information can be reliably provided to such a user 8.

Sixth Embodiment

While the above description has been made as to a case where the information output apparatus 1 outputs information via a display, the information can be outputted by sound including but not limited to voice and other sounds. In this case, where the user 8 is away from an output unit of the information output apparatus 1, as is the case with the above embodiments, a voice message to notify the user 8 may be shortened to decrease the amount of information, and the short voice message may be repeatedly provided to the user 8 so that he or she can recognize the information. Then, when the user 8 comes near the information output apparatus 1 and can catch even a long voice message, detailed information may be provided to the user 8. When the user 8 touches the contact sensing unit 6, the control unit 2 may convert voice information into text information so that the text information can be printed when the user 8 enters a print instruction via the contact sensing unit 6. With this configuration, the same functions and advantages as is the case with the above-described embodiments can be obtained.

For example, under the circumstances shown in FIG. 2 (display unit 4 also having available audio-output), based on an input signal from the position detection unit 5 (providing the determination results), the control unit 2 determines that the user 8 is present in the area B at a specified distance (for example, 5-15 m) away from the display unit 4, and causes the display unit 4 to display and sound a headline of information as outline contents, so that the user can recognize the overview of the information even at a distance from the display unit 4. As a headline, "New product YY will be released. ¥XXXX" can be displayed and sounded in the display unit 4 for an example.

The sounds emitted from the output apparatus 1 may vary in length of the message as described above and in complexity (from simple voice to voice accompanied by a background soundtrack).

It is appreciated that various combinations of music, voice, soundtracks, and the like may be used in conjunction with the output apparatus 1.

When the user 8 is not in the area A nor B, one of the following approaches can be adopted: an approach of displaying and sounding only a headline of the information in the display unit 4 in a display and sound mode when it is assumed that the user 8 is present in the area B; and an approach of displaying and sounding no information in the display unit 4. In the latter structure, power can be saved. Further, these two approaches may be combined such that the first approach may last for a given period of time, then the second approach is adopted after no one entering the predefined areas (A or B, for example). Further, the sound and visual content may be modified independently of each other (for instance, the sound may continue to play without any visual information in the first approach or the visual information may continue to play without sound in the first approach).

For example, under the circumstances shown in FIG. 3, based on an input signal from the position detection unit 5, the control unit 2 determines that the user 8 is present in the area A at a specified distance (e.g. 0-5 m) away from the display unit 4. To provide the detailed information via sound and display to the user 8 who is near the display unit 4, the control unit 2 causes the display unit 4 to display and sound detailed contents of information. For instance, the headline "On March 11, Company XX announced that they will release a new product YY, which is of smaller size and weight, multi-functional, and capable of processing at high speed, on April 25" may be provided.

Seventh through Tenth Embodiments

The seventh through tenth embodiments relate to the second through fifth embodiments but where the information is provided by sound. The information modification considerations of various embodiments 2-5 may similarly be applied to sound as embodiments 7-10. For instance, embodiment 8, corresponding to embodiment 3, relates to the angle considerations of a user's location compared to the output apparatus 1 as modifying the length and/or complexity of output sound. This may be relevant where a sound system has directional or attenuated components. In this regard, off-axis listeners may have greater difficulty hearing and/or understanding complex or lengthy information. Alternatively, the relevancy of the sound information may be less relevant when the user's angle to the output apparatus 1 is large. In addition, in the case of the information apparatus 1 which were described as the embodiment 2-5, the information apparatus 1 can treat the auditory information like the visual information or with the visual information as embodiments 7-10. Accordingly, both visual and auditory information can be provided to a user.

While the various aspects of the invention have been described in conjunction with the illustrative aspects outlined above, various alternatives, modifications, variations, improvements and/or substantial equivalents, whether known or that are or may be presently unforeseen, may become apparent to those having at least ordinary skill in the art.

For example, the display unit 4 may have an integrated (physically and/or electrically) display surface or may be a projection-type device that projects visual information onto a separate surface.

Accordingly, the illustrative aspects of the invention, as set forth above, are intended to be illustrative, not limiting. Various changes may be made without departing from the spirit and scope of the invention. Therefore, the invention is intended to embrace all known or later developed alternatives, modifications, variations, improvements and/or substantial equivalents.

What is claimed is:

1. An information control system outputting information capable of being output by an output device, said information control system comprising:
   a determination device configured to determine a presence or absence of a user who uses information outputted by the output device and then determine an area where the user is present when said determination device determines the presence of the user;
   a control device configured to control the output device to increase an amount of information outputted by the output device in incremental steps as the area where the user is close to the output device,
   wherein the control device changes the amount of information by changing at least one of (i) degree of detail of information, (ii) the number of pieces of information, (iii) a scrolling speed of information output, and (iv) a switching cycle of information output.

2. The information control system according to claim 1, wherein a specified position on the output device is regarded as an origin of the output device,
   a first straight line passes through the origin and a user position on a horizontal plane containing the origin,
   a second straight line extends from the origin and is perpendicular to the output device on the horizontal plane containing the origin, and
   the control device controls the output device to decrease the amount of information outputted by the output device when an angle between the first straight line and the second straight line is equal to or greater than a predetermined angle as compared with the amount of information outputted by the output device when the angle is less than the predetermined angle.

3. The information control system according to claim 1, wherein a specified position on the output device is regarded as an origin of the output device,
   a first straight line passes through the origin and a user position where the user is present on a vertical plane containing a second straight line that extends from the origin and is perpendicular to the output device on a horizontal plane containing the origin,
   a third straight line extends from the origin and is perpendicular to the output device on the vertical plane, and
   the control device controls the output device to decrease the amount of information outputted by the output device when an angle between the first straight line and the third straight line is equal to or greater than a predetermined angle as compared with the amount of information outputted by the output device when the angle is less than the predetermined angle.

4. The information control system according to claim 1, further comprising:
   a print device configured to print the information outputted by the output device; and
   a print instruction input device configured to instruct the print device on a print of information outputted by the output device.

5. The information control system according to claim 1, wherein said information includes visual information.

6. The information control system according to claim 1, wherein said information includes auditory information.

7. The information control system according to claim 1, wherein said information includes at least visual and auditory information.

8. The information control system according to claim 1, the determination device being further configured to detect a position of the user; and
   further comprising:
   a map storage device configured to divide a specified area based on the output device into a plurality of sections and store a map which is created to classify the sections into any of predetermine classes;
   a judgment device configured to judge the class of a section where the user is present based on the map stored by the map storage device and a result by the determination device when the user is present in the specified area,
   and the control device being further configured to control the output device to output an amount of information commensurate with the class judged by the judgment device when the user is present in the specified area.

9. The information control system according to claim 8, further comprising:
   a print device configured to print the information outputted by the output device, and
   a print instruction input device configured to instruct the print device on a print of information outputted by the output device.

10. The information control system according to claim 1, the determination device being further configured to determine whether a user is located in one of a first area and a second area, and
    the control device being further configured to control the output device to modify an amount of information outputted by the output device based on which area of said at least two areas in which said user is located.

11. The information output system according to claim 10, wherein said areas includes said first area, said second area, and a third area.

12. The information output system according to claim 10, said determination device configured to determine a position of the user in said area.

13. The information control system according to claim 10, said determining device being further configured to determine whether the user has remained in an at least the first area for a predetermined period, and
    the control device being further configured to control the output device to modify an amount of information outputted by the output device based on whether said user has remained in said at least first area for said predetermined period.

14. The information control system according to claim 1, wherein the control device changes the amount of information by changing the degree of detail of information.

15. The information control system according to claim 1, wherein the control device changes the amount of information by changing the number of pieces of information.

16. The information control system according to claim 1, wherein the control device changes the amount of information by changing the scrolling speed of information output.

17. The information control system according to claim 1, wherein the control device changes the amount of information by changing the switching cycle of information output.

18. An information control system outputting information capable of being output by an output device, said information control system comprising:

a measurement device configured to measure a distance between the output device and a user who uses information outputted by the output device; and a control device configured to control the output device to increase an amount of information outputted by the output device when the distance measured by the measurement device is less than a predetermined distance as compared with the amount of information outputted by the output device when the distance measured by the measurement device is equal to or greater than the predetermined distance, wherein the control device changes the amount of information by changing at least one of (i) degree of detail of information, (ii) the number of pieces of information, (iii) a scrolling speed of information output, and (iv) a switching cycle of information output.

19. The information control system according to claim 18, wherein a specified position on the output device is regarded as an origin of the output device, a first straight line passes through the origin and a user position on a horizontal plane containing the origin, a second straight line extends from the origin and is perpendicular to the output device on the horizontal plane containing the origin, and the control device controls the output device to decrease the amount of information outputted by the output device when an angle between the first straight line and the second straight line is equal to or greater than a predetermined angle as compared with the amount of information outputted by the output device when the angle is less than the predetermined angle.

20. The information control system according to claim 18, wherein a specified position on the output device is regarded as an origin of the output device, a first straight line passes through the origin and a user position where the user is present on a vertical plane containing a second straight line that extends from the origin and is perpendicular to the output device on a horizontal plane containing the origin, a third straight line extends from the origin and is perpendicular to the output device on the vertical plane, and the control device controls the output device to decrease the amount of information outputted by the output device when an angle between the first straight line and the third straight line is equal to or greater than a predetermined angle as compared with the amount of information outputted by the output device when the angle is less than the predetermined angle.

21. The information control system according to claim 18, further comprising:

a print device configured to print the information outputted by the output device; and a print instruction input device configured to instruct the print device on a print of information outputted by the output device.

22. The information control system according to claim 18, wherein said information includes visual information.

23. The information control system according to claim 18, wherein said information includes auditory information.

24. The information control system according to claim 18, wherein said information includes at least visual and auditory information.

25. The information control system according to claim 8, wherein the control device changes the amount of information by changing the degree of detail of information.

26. The information control system according to claim 8, wherein the control device changes the amount of information by changing the number of pieces of information.

27. The information control system according to claim 18, wherein the control device changes the amount of information by changing the scrolling speed of information output.

28. The information control system according to claim 18, wherein the control device changes the amount of information by changing the switching cycle of information output.

* * * * *